United States Patent [19]

Tyson et al.

[11] 4,024,148

[45] May 17, 1977

[54] CRYSTALLINE FORM OF QUINACRIDONE

[75] Inventors: Ronald S. Tyson, Piscataway; Leonard Shapiro, East Brunswick, both of N.J.

[73] Assignee: Sun Chemical Corporation, New York, N.Y.

[22] Filed: Feb. 2, 1976

[21] Appl. No.: 654,271

Related U.S. Application Data

[63] Continuation-in-part of Ser. No. 583,769, June 4, 1975, abandoned.

[52] U.S. Cl. .................... 260/279 QA; 106/288 Q; 260/37 R
[51] Int. Cl.² ........................................ C09B 48/00
[58] Field of Search ............................ 260/279 QA

[56] References Cited

UNITED STATES PATENTS

| 3,256,285 | 6/1966 | Fuchs et al. ...................... 260/279 |
| 3,547,925 | 12/1970 | Wagener ......................... 260/279 |
| 3,726,873 | 4/1973 | Hashizume et al. ........... 260/279 R |

FOREIGN PATENTS OR APPLICATIONS 986,737  3/1965  United Kingdom

*Primary Examiner*—Donald G. Daus
*Assistant Examiner*—Diana G. Rivers
*Attorney, Agent, or Firm*—Cynthia Berlow

[57] ABSTRACT

A new crystalline form of quinacridone is prepared by conditioning crude quinacridone with a water-insoluble liquid having at least one hydroxyl group, a surfactant, and water.

1 Claim, No Drawings

CRYSTALLINE FORM OF QUINACRIDONE

This application is a continuation-in-part of application Ser. No. 583,769 (filed June 4, 1975, now abandoned).

This invention relates to improved quinacridone pigments. More specifically it relates to a new crystalline form of quinacridone and to a process for producing it.

It is known that linear trans quinacridone which is represented by the structural formula

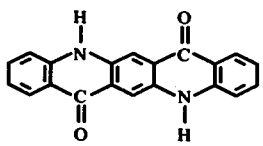

can be produced as pigments in a variety of crystal forms which exhibit different X-ray diffraction patterns, Examples of these include I. alpha phase, defined in U.S. Pat. No. 2,844,484 as characterized by three strong lines with interplanar spacings of 14.24A, 3.46A, and 3.19A; two lines of moderate intensity with interplanar spacings of 6.32A and 7.13A; two weak lines with interplanar spacings of 5.30A and 4.27A. This is stated to be a bluish red pigment of excellent strength and intensity.

II. beta phase, defined in U.S. Pat. No. 2,844,485 as characterized by two strong lines at interplanar spacings of 15.23A and 3.31A and three lines of lesser intensity at interplanar spacings of 7.55A, 5.47A, and 4.06A. This is stated to be a violet pigment of excellent intensity and strength.

III. gamma phase, defined in U.S. Pat. No. 2,844,581 as characterized by three strong lines at interplanar spacings of 13.58A, 6.41A, and 3.37A and four relatively weak lines at interplanar spacings of 6.70A, 5.24A, 4.33A, and 3.74A. This is stated to be a bluish red pigment of excellent strength and intensity.

IV. delta phase, defined in U.S. Pat. No. 3,272,821 as characterized by three strong lines at interplanar spacings of 13.6A, 6.75A, and 6.41A; three moderate lines at interplanar spacings of 6.63A, 3.37A, and 3.34A; and weak lines at interplanar spacings of 5.23A, 4.36A, 4.11A, 3.74A, 3.55A, 3.18A, 3.12A, 2.95A, and 2.18A. This is stated to be a reddish pigment.

V. epsilon phase, defined in Japanese Pat. No. 69-22420 as characterized by three strong lines at interplanar spacings of 26.4A, 13.7A, and 6.5A; two moderate lines at interplanar spacings of 13.3A and 13.1A; and weak lines at interplanar spacings of 25.1A, 23.7A, 20.4A, and 16.9A. This is stated to be a red pigment of brilliant yellowish shade.

VI. zeta phase, defined in U.S. Pat. No. 3,892,571 as characterized by six strong lines at interplanar spacings of 14.06A, 6.38A, 3.45A, 3.35A, 3.11A, and 2.11A and six weak lines at interplanar spacings of 7.05A, 4.35A, 3.91A, 3.59A, 3.18A, and 2.83A. In hue this product is a brilliant red pigment of excellent strength and intensity.

Crude quinacridones have little color value and must be altered to a suitable form to develop the desired pigmentary properties. This process, known as conditioning, is generally carried out by grinding or milling, usually in the presence of a solvent. U.S. Pat. No. 2,844,484, for example, discloses the dry milling of linear quinacridones with an inorganic salt such as sodium chloride; U.S. Pat. No. 2,844,485 discloses milling with an inorganic salt in the presence of an aromatic hydrocarbon or halogenated aromatic hydrocarbon liquid; U.S. Pat. No. 2,844,581 discloses salt milling with dimethyl formamide.

It has now been found that there exists a further crystal modification of quinacridone which differs from the known crystalline forms of quinacridone and its derivatives both in shade and in purity of color.

The quinacridone product is characterized by an X-ray diffraction pattern exhibiting four strong lines corresponding to interplanar spacings of 14.3A, 6.4A, 3.46A, and 3.21A; a moderate line corresponding to interplanar spacing of 7.1A; three weak lines with interplanar spacings of 5.4A, 4.2A, and 2.35A; and two very weak lines with interplanar spacings of 5.0A and 4.4A. In hue this product is a brilliant yellow shade of red having excellent strength, intensity, and transparency. In properties this product demonstrates the resistance to light, acids, alkalies, and solvents which characterizes the previously known crystal varieties of linear trans quinacridones.

In accordance with the practice of this invention, the crude linear quinacridone is conditioned by adding the presscake to a water-insoluble liquid having at least one hydroxyl group, a surfactant, and water, the amount of each varying somewhat with the specific agent selected.

The resulting mixture is heated with stirring to reflux and held at that temperature for about 1 to 6, and preferably about 3 to 4 hours. It is then cooled to about 40° to 70° C., and preferably to about 50° C.; made basic, when necessary, for example with sodium hydroxide or potassium hydroxide; and then heated to about 80° to 100° C., and preferably about 80° to 85° C. When nonacidic solvents are used, they are distilled before filtering.

The pigment product is then filtered, washed with water, and dried at about 60° to 90° C., and preferably at about 70° C.

Suitable water-insoluble hydroxyl-containing materials are preferably organic and include the higher alcohols, phenols, higher aliphatic carboxylic acids, and the like, and their mixtures. Specific examples include, but are not limited to, n-amyl alcohol, n-hexyl alcohol, n-octyl alcohol, isopentyl alcohol, o-methyl cyclohexanol, valeric acid, n-carproic acid, 2-ethylhexanoic acid, capric acid, oleic acid, and o-nitrophenol.

Suitable surfactants include, but are not limited to, sodium naphthalene sulfonic acid formaldehyde condensate, alkyl aryl ethers, dioctyl sodium sulfosuccinate, sodium lauryl sulfate, cetyl trimethyl ammonium chloride, and the like, and their mixtures.

The method of preparing the crude quinacridone is not critical. In general, however, it is convenient to prepare it by the ring closure in polyphosphoric acid of 2,5-dianilinoterephthalic acid or an ester thereof and striking the resulting solution into water, as described in, for example, U.S. Pat. No. 3,342,823.

The new quinacridone gives an X-ray diffraction pattern which shows that the crystal structure is different from those of the known quinacridone pigments. While this new crystalline form shows some X-ray spacings similar to the known forms, there are many intense and weak lines that do not correspond to those of the known alpha-, beta-, gamma-, delta-, epsilon-, and zeta-forms of quinacridone, as shown in the following table:

| Quinacridone Pigment of this Invention | α | β | γ | Δ | ε | zeta |
|---|---|---|---|---|---|---|
| 14.3s | 14.24s | 15.23s | 13.58s | 13.6s | 13.6s | 14.06s |
| 7.1m | 7.13m | 7.55m | 6.70m/w | 6.75s | 6.76m | 7.05w |
|  |  |  |  |  | 6.66m |  |
| 6.4s | 6.32m |  | 6.41s | 6.41s | 6.47s | 6.38s |
| 5.4w | 5.30w |  |  |  |  |  |
| 5.0vw | 4.27w | 4.06m | 4.33m/w | 4.36w | 5.25w | 4.35w |
| 4.4vw |  |  |  |  |  |  |
| 4.2w |  |  |  |  | 4.35w | 3.91w |
|  |  |  | 3.74m/w | 3.74w | 3.75w |  |
|  |  |  |  | 3.55w | 3.52w | 3.59w |
| 3.46s | 3.46s |  |  |  | 3.38s | 3.45s |
|  |  | 3.31s | 3.37s | 3.34m |  | 3.35s |
| 3.21s | 3.19s |  |  | 3.18w |  | 3.18w |
|  |  |  |  | 3.12w |  | 3.11s |
|  |  |  |  | 2.81w |  | 2.83w |
| 2.35w |  |  |  |  |  | 2.11s | s=strong, m=moderate, w=weak, vw=very weak.

Although there are similarities between the product of this invention and the known alpha-phase quinacridone, there are distinct differences between the two, for example the alpha-phase has weak peaks at 4.27A and 5.30A, neither of which is present in this new form; and the new crystalline form of quinacridone has a strong peak at 6.4A which is absent from the alpha interplanar spacings.

Compared to other quinacridone crystalline types of similar shade, the product of this invention is stronger, cleaner, more transparent, and more convenient and economical to produce. The present process eliminates the need for grinding equipment to change the crystal phase of the quinacridone.

The product of this invention is used advantageously in all major areas of pigment application, such as inks, paints, plastics, and textiles.

The following examples which are set forth to describe the preferred embodiments illustrate in further detail the invention and the manner in which this new crystalline form of quinacridone may be prepared and used as a pigment.

EXAMPLE I

A. 100 Parts of polyphosphoric acid (115% as $H_3PO_4$) were thoroughly mixed with 20 parts of 2,5-dianilinoterephthalic acid; the mixture was heated with agitation to 85° C. and held at this temperature for about 24 hours. The reaction mixture was then cooled to about 65° C., and 10 parts of water gradually added with stirring. The mass was then drowned into an additional 700 parts of water, precipitating a crude quinacridone.

B. 100 Parts of the crude quinacridone presscake (15 parts dry basis) of part (A) were added to a mixture of 50 parts of n-amyl alcohol, 100 parts of water, and 3 parts of cetyl trimethyl ammonium chloride. The resulting slurry was refluxed for 4 hours, cooled to 60° C., adjusted with 50% NaOH to pH 9, and heated to 85° C. The solvent was distilled, and the pigment was then filtered, washed free of water-soluble minerals with cold water, and dried at 55° C. 14.8 Parts of brilliant red quinacridone were obtained.

The linear quinacridone product was crystalline and exhibited the following X-ray diffraction pattern: strong lines corresponding to interplanar spacings of 14.3A, 6.4A, 3.46A, and 3.21A; a moderate line corresponding to interplanar spacing of 7.1A; weak lines corresponding to interplanar spacings of 5.4A, 4.2A, and 2.35A; and very weak lines corresponding to interplanar spacings of 5.0A and 4.4A.

The product is different from the forms of quinacridone that have been described previously. Because of its high strength, transparency, and cleanliness, this new form is a superior red pigment particularly suited for use in printing inks, paints, plastics, and textiles.

EXAMPLE II

The procedure of Example I (B) was repeated with 100 parts of crude presscake, 50 parts of valeric acid, 5 parts of dioctyl sodium sulfosuccinate, and 100 parts of water. The results were comparable.

EXAMPLE III

The procedure of Example I (B) was repeated with 100 parts of crude presscake, 60 parts of o-nitrophenol, 3 parts of sodium naphthalene sulfonic acid formaldehyde condensate, and 100 parts of water. The results were comparable.

EXAMPLE IV

The procedure of Example I (B) was repeated with 100 parts of crude presscake, 5 parts of sodium lauryl sulfate, 100 parts of water, and 50 parts of one of each of the following instead of n-amyl alcohol: n-hexyl alcohol, n-octyl alcohol, isopentyl alcohol, o-methyl cyclohexanol, n-caproic acid, 2-ethylhexanoic acid, capric acid, and oleic acid. The results were comparable.

What is claimed is:

1. A red crystalline linear quinacridone pigment characterized by an X-ray diffraction pattern exhibiting four strong lines corresponding to interplanar spacings of 14.3A, 6.4A, 3.46A, and 3.21A; a moderate line corresponding to interplanar spacing of 7.1A; three weak lines corresponding to interplanar spacings of 5.4A, 4.2A, and 2.35A; and two very weak lines corresponding to interplanar spacings of 5.0A and 4.4A.

* * * * *